(12) United States Patent
Peng

(10) Patent No.: US 12,524,134 B2
(45) Date of Patent: Jan. 13, 2026

(54) PAGE INFORMATION DISPLAY METHOD, APPARATUS, COMPUTER DEVICE AND STORAGE MEDIUM

(71) Applicant: Beijing Zitiao Network Technology Co., Ltd., Beijing (CN)

(72) Inventor: Dali Peng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 229 days.

(21) Appl. No.: 18/526,779

(22) Filed: Dec. 1, 2023

(65) Prior Publication Data
US 2024/0248584 A1 Jul. 25, 2024

(30) Foreign Application Priority Data
Jan. 19, 2023 (CN) .......................... 202310102427.1

(51) Int. Cl.
*G06F 3/0483* (2013.01)
*G06F 3/0485* (2022.01)
*G06F 40/149* (2020.01)

(52) U.S. Cl.
CPC .......... *G06F 3/0483* (2013.01); *G06F 3/0485* (2013.01); *G06F 40/149* (2020.01)

(58) Field of Classification Search
CPC ...... G06F 3/0481; G06F 3/0482; G06F 3/048; G06F 3/0484; G06F 3/14; G06F 3/0488; G06F 9/445; G06F 3/0485; G06F 3/0486; G06F 9/451; G06F 3/041; G06F 3/0483; G06F 3/12; G06F 3/00; G06F 3/01; G06F 9/44; G06F 9/54; G06F 3/023; G06F 3/033; G06F 3/16; G06F 9/46; G06F 1/16;
(Continued)

(56) References Cited

U.S. PATENT DOCUMENTS

2009/0178009 A1* 7/2009 Dotson ................. G06F 16/904
715/854
2016/0182423 A1* 6/2016 Tevosyan ............ G06F 3/04883
715/752

FOREIGN PATENT DOCUMENTS

| CN | 110502307 A | 11/2019 |
| CN | 112783394 A | 5/2021 |

(Continued)

OTHER PUBLICATIONS

Notice of Grant of Invention Patent Right received for Chinese Patent Application No. 202310102427.1, mailed on Jan. 22, 2025, 8 pages (4 pages of English Translation and 4 pages of Original Document).

(Continued)

*Primary Examiner* — Rayeez R Chowdhury

(57) ABSTRACT

The present disclosure provides a page information display method, apparatus, computer device and storage medium, wherein, the method comprises: in response to a trigger operation for a target vertical tag, displaying first view information in a first area of an information display page through a main view control; laying out a view page turning control in the main view control through a nested layout control nested in the main view control, and nesting a sub-view control in the view page turning control; displaying a plurality of information flow tags through the view page turning control, and displaying each multimedia content corresponding to the selected information flow tag in a second area of the information display page through the sub-view control.

20 Claims, 5 Drawing Sheets

(58) Field of Classification Search
CPC ...... G06F 11/30; G06F 13/00; G06F 3/04812; G06F 3/04886; G06F 30/10; G06F 9/50
See application file for complete search history.

(56) References Cited

FOREIGN PATENT DOCUMENTS

| | | |
|---|---|---|
| CN | 114115649 A | 3/2022 |
| CN | 115269093 A | 11/2022 |

OTHER PUBLICATIONS

Notice of First Examination Opinion for Chinese Application No. 202310102427.1, mailed Nov. 10, 2024, 6 pages.

\* cited by examiner

PAGE INFORMATION DISPLAY METHOD, APPARATUS, COMPUTER DEVICE AND STORAGE MEDIUM

This application claims the benefit of CN application No. 202310102427.1 filed on Jan. 19, 2023, the disclosure of which is herein incorporated by reference in its entirety.

TECHNICAL FIELD

The present disclosure relates to the field of computer technology, and specifically, to a page information display method, apparatus, computer device and storage medium.

BACKGROUND

Feed stream, as an information stream that continuously updates and presents content to users, can theoretically realize providing users with unlimited data content. In order to realize to achieve richer information styles and information arrangement methods in the feed stream, it can usually be achieved by adding multiple switching tabs to the feed stream.

SUMMARY

The embodiments of the present disclosure provide at least a page information display method, apparatus, computer device, and storage medium.

In a first aspect, some embodiments of the present disclosure provide a page information display method, comprising:
  in response to a trigger operation for a target vertical tag, displaying first view information in a first area of an information display page through a main view control;
  laying out a view page turning control in the main view control through a nested layout control nested in the main view control, and nesting a sub-view control in the view page turning control;
  displaying a plurality of information flow tags through the view page turning control, and displaying each multimedia content corresponding to the selected information flow tag in a second area of the information display page through the sub-view control; the multimedia content constituting second view information;
  wherein, in different sliding states for performing a sliding operation on the information display page, page sliding is controlled through different view controls, and the sliding states are used to indicate whether the first view information is slid out of the current page display range; the different view controls include the main view control and the sub-view control.

In some possible implementations, the sliding operation includes a first sliding operation; in a case that the sliding state indicates that the first view information has not been slid out of the current page display range, after displaying each multimedia content corresponding to the selected information flow tag in the second area of the information display page, further comprising:
  in response to the first sliding operation, controlling the first view information to slide in a first sliding direction according to a first sliding distance through the main view control;
  in response to a nested scrolling enable command, controlling the multimedia content displayed in the second area to slide in the first sliding direction according to the first sliding distance; wherein, there are changes to the information displayed in the first area and in the second area before and after sliding.

In some possible implementations, the sliding operation includes a second sliding operation for a first preset direction;
  in a case that the sliding state indicates that the first view information is slid out of the current page display range, after displaying each multimedia content corresponding to the selected information flow tag in the second area of the information display page, further comprising:
  in response to a second sliding operation, controlling the first view information to slide in the first preset direction according to currently dragged first distance in a second sliding distance through the main view control;
  in response to the first view information being slid out of the current page display range, sliding the multimedia content displayed in the second area through an offset sliding method corresponding to the sub-view control according to the remaining sliding distance in the second sliding distance; wherein, each multimedia content corresponding to the information flow tag is displayed in the first area after sliding, and the multimedia content displayed in the second area changes; the remaining sliding distance being equal to the difference between the second sliding distance and the first distance.

In some possible implementations, after sliding the multimedia content displayed in the second area according to the remaining sliding distance in the second sliding distance, further comprising:
  in response to a third sliding operation for a second preset direction, sliding the displayed multimedia content in the second preset direction according to currently dragged second distance in a third sliding distance through the sub-view control;
  in response to the first view information being slid to the current page display range, in response to the communication between a nested scrolling child interface of the sub-view control and a nested scrolling parent interface of the main view control, controlling the first view information to slide according to the difference between the third sliding distance and the second distance using a nested scroll command.

In some possible implementations, controlling the first view information to slide according to the difference between the third sliding distance and the second distance comprises:
  acquiring a target field used to indicate a page scrolling state;
  the page scrolling state being a state that, after in response to a page scrolling operation, controlling the information display page to slide, it is necessary to continue to scroll the information display page according to the page sliding speed at the end of the page sliding;
  in a case that the target field indicates that the page scrolling state is a closed state, controlling the first view information to slide according to the difference.

In some possible implementations, the sliding operation includes a page scrolling operation; in a case that the sliding state indicates that the first view information is slid out of the current page display range, after displaying each multimedia content corresponding to the selected information flow tag in the second area of the information display page, further comprising:
  in response to the page scrolling operation for the first preset direction, determining a first inherited sliding speed of the information display page when the page scrolling operation ends; determining the total distance to be slid according to the first inherited sliding speed; controlling page sliding according to the first inherited sliding speed and the total distance to be slid through the main view control.

In some possible implementations, controlling page sliding according to the first inherited sliding speed and the total distance to be slid comprises:

determining a target sliding distance for controlling the sliding of the first view information according to the first inherited sliding speed;

in a case that the target sliding distance is less than the total distance to be slid, determining a second inherited sliding speed after sliding the target sliding distance;

in response to the first view information being slid out of the current page display range, sliding the displayed multimedia content according to the second inherited sliding speed.

In a second aspect, some embodiments of the present disclosure further provide a page information display apparatus, comprising:

a first display module configured to display first view information in a first area of an information display page through a main view control in response to a trigger operation for a target vertical tag; a nested module configured to layout a view page turning control in the main view control through a nested layout control nested in the main view control, and nest a sub-view control in the view page turning control;

a second display module configured to display a plurality of information flow tags through the view page turning control, and display each multimedia content corresponding to the selected information flow tag in a second area of the information display page through the sub-view control; the multimedia content constituting second view information;

wherein, in different sliding states for performing a sliding operation on the information display page, page sliding is controlled through different view controls, and the sliding states are used to indicate whether the first view information is slid out of the current page display range; the different view controls include the main view control and the sub-view control.

In a third aspect, an implementation of the present disclosure further provides a computer device, a processor, and a memory having machine-readable instructions executable by the processor stored thereon, the processor being configured to execute the machine-readable instructions stored in the memory, when the machine-readable instructions are executed by the processor, when the machine-readable instructions are executed by the processor, execute the first aspect above, or the steps in any one of the possible implementations in the first aspect.

In a fourth aspect, an implementation of the present disclosure further provides a computer-readable storage medium having a computer program stored thereon, which, when run, executes the first aspect above, or the steps in any one of the possible implementations in the first aspect.

For a description of the effects of the above page information display apparatus, computer device, and computer-readable storage medium, refer to the description of the above page information display method, which will not be repeated here again.

In order to make the above objects, features and advantages of the present disclosure more obvious and understandable, preferred embodiments are enumerated below, and are described in detail below with reference to the accompanying drawings.

BRIEF DESCRIPTION OF THE DRAWINGS

In order to explain the technical solutions of the embodiments of the present disclosure more clearly, the drawings need to be used in the embodiments will be briefly introduced below. The drawings here are incorporated into and constitute a part of the specification. These drawings illustrate embodiments consistent with the present disclosure and, together with the description, serve to explain the technical solutions of the present disclosure. It should be understood that the drawings below only illustrate certain embodiments of the present disclosure, and therefore should not be regarded as limiting the scope. Those ordinary skill in the art may also obtain other relevant drawings in view of these drawings without exerting creative efforts.

DETAILED DESCRIPTION

Figure 1:
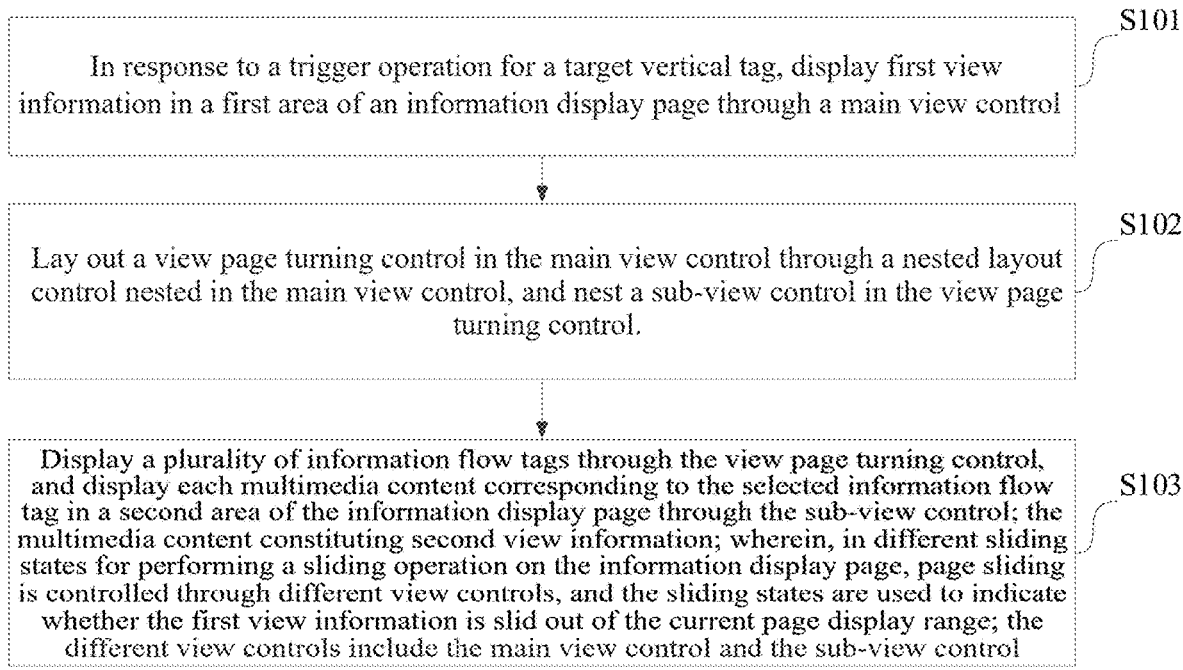
FIG. 1 shows a flow chart of a page information display method provided by some embodiments of the present disclosure.

In order to make the objects, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are only some of the embodiments of the present disclosure, not all of the embodiments. The components of the disclosed embodiments generally described and illustrated herein may be arranged and designed in a variety of different configurations. Therefore, the following detailed description of the embodiments of the disclosure is not intended to limit the scope of the claimed disclosure, but rather to represent selected embodiments of the disclosure. Based on the embodiments of the present disclosure, all other embodiments obtained by those skilled in the art without any creative efforts shall fall within the scope of protection of the present disclosure.

In addition, the terms "first", "second", etc. in the description and claims and the above drawings of the embodiments of the present disclosure are used to distinguish similar objects, and are not necessarily used to describe a specific order or sequence. It is to be understood that the data so used are interchangeable under appropriate circumstances so that the embodiments described herein can be practiced in sequences other than those illustrated or described herein.

"A plurality or several" mentioned herein means two or more. "And/or" describes association relationship between related objects, indicating that there can be three relationships. For example, A and/or B can mean: A exists alone, A and B exist simultaneously, and B exists alone. The character "/" generally indicates that the related objects are in an "or" relationship.

Feed stream, as an information stream that continuously updates and presents content to users, can theoretically realize providing users with unlimited data content. In order to realize to achieve richer information styles and information arrangement methods in the feed stream, it can usually be achieved by adding multiple switching tabs to the feed stream.

But under normal circumstances, a feed stream is usually implemented directly using a RecyclerView tool, and the multiple switching tabs are also directly nested and laid out in the RecyclerView. As such, not only may it be impossible to find a switching tab in time, but it may also cause problems such as unsmooth of switching tabs and stuck in refreshing the feed stream.

It has been found through research that, usually, to implement infinite feed stream in a RecyclerView tool, a sub-RecyclerView can usually be nested in the main RecyclerView. However, to realize the interaction between the main RecyclerView and the sub-RecyclerView, it is usually necessary to use a recursive query method to find the main RecyclerView and the sub-RecyclerView for interactive processing according to a preset determination condition (for example, the sub-view (view) is a view of RecyclerView type). However, the above method not only may not find corresponding sub-RecyclerView, but also causes a large loss in performance, which results in most resources tending to be recursively queried, which will affect the normal switching of tabs and the normal refreshing of the feed stream. Therefore, how to implement richer information styles and information arrangement methods in the feed stream while ensuring smooth page sliding has become an urgent problem that needs to be solved.

Based on the above research, the present disclosure provides a page information display method, apparatus, computer device and storage medium, which, by nesting a layout control in a main view control, can not only realize to associate the main view control with information nested in the layout control, but also locate to the information nested in the layout control with almost zero performance loss. Since a view page turning control including an information flow tab (that is, information flow tab) is nested in the layout control and a sub-view page control is nested in the view page turning control, an accurate association between the main view control and the information flow tab in the view page turning control and the sub-view control under the information flow tab is realized through the layout control, that is, it is possible to realize that, when a target vertical tab is triggered, not only can the sub-view control be quickly located, but also resource consumption can be reduced, thereby enabling more resources to be used to refresh multimedia content in sub-view controls, effectively solving the problem of stuck in refreshing the feed stream. Since the view page turning control has reliable view switching performance, it is possible to realize smooth switching between multiple information flow tabs by deploying the multiple information flow tabs in the view page turning control, thereby improving the page turning effect. By deploying different styles of multimedia content and arranging them in different arrangements through sub-view controls under different information flow tabs, it is possible to effectively improve the diversity of information display. In addition, by flexibly switching between the main view control and the sub-view control to control page sliding in different sliding states, it is possible to further improve the smoothness of page sliding.

The defects that exist in the above solutions are all the results obtained by the inventor after practice and careful study. Therefore, the discovery process of the above problems and the solutions proposed by the present disclosure for the above problems below all should be the contributions made by the inventor to this disclosure during the process of this disclosure.

It should be noted that similar reference numerals and letters represent similar items in the following drawings, therefore, once an item is defined in one drawing, it does not need to be further defined and explained in subsequent drawings.

It can be understood that before using the technical solutions disclosed in each embodiment of the present disclosure, users should be informed of the type, scope of use, usage scenarios, etc. of the personal information involved in the present disclosure in an appropriate manner in accordance with relevant laws and regulations and obtain authorization from the users.

It should be noted that the specific nouns mentioned in the embodiments of the present disclosure include:

RecyclerView: a recycler view, which appears as an enhanced version of the list view ListView and the grid view GridView, with the purpose to display a large amount of content on a limited screen, and it realizes view code decoupling in use and has powerful item reuse mechanism in function.

ViewPage2: a component that can realize the effect of sliding switching pages. It can usually be used with other components to realize banner switching.

NestedChildLayout: a nested sub-layer, which can be used as a sub-view of the main RecyclerView and can be used for page layout and quickly find a nested RecyclerView of the main RecyclerView. In order to facilitate understanding of these embodiments, a page information display method disclosed in the embodiments of the present disclosure will be first introduced in detail. The execution subject of the page information display method provided by the embodiments of the present disclosure is generally a terminal device or other processing device with certain computing capabilities, wherein the terminal device may be a User Equipment (UE), a mobile device, a user terminal, a terminal, a Personal Digital Assistant Device (PDA), a handheld device, a computer device, etc.; in some possible implementations, the page information display method may be implemented by a processor calling computer readable instructions stored in a memory.

The page information display method provided by the embodiments of the present disclosure will be described below by taking the execution subject as a computer device as an example.

As shown in FIG. 1, it is a flow chart of a page information display method provided by some embodiments of the present disclosure and may comprise following steps:

S101: in response to a trigger operation for a target vertical tag, displaying first view information in a first area of an information display page through a main view control.

Here, the information display page may be used to display recommended information, specifically, it may be an application page of any application or a page corresponding to any web page. The target vertical tag may be a triggered vertical tab among multiple vertical tags (that is, vertical tabs) displayed at the top of the information display page. Under different vertical tabs, there may be used to display different types of information. For example, under a Recommendation tab, there may be used to display recommended information, under a Follow tab, there may be used to display information that the user is followed, under a Listening to Books tab, there may be used to display each book information for voice playback, and under a Comics tab, there may be used to display book information of comic type, etc.

Figure 2:
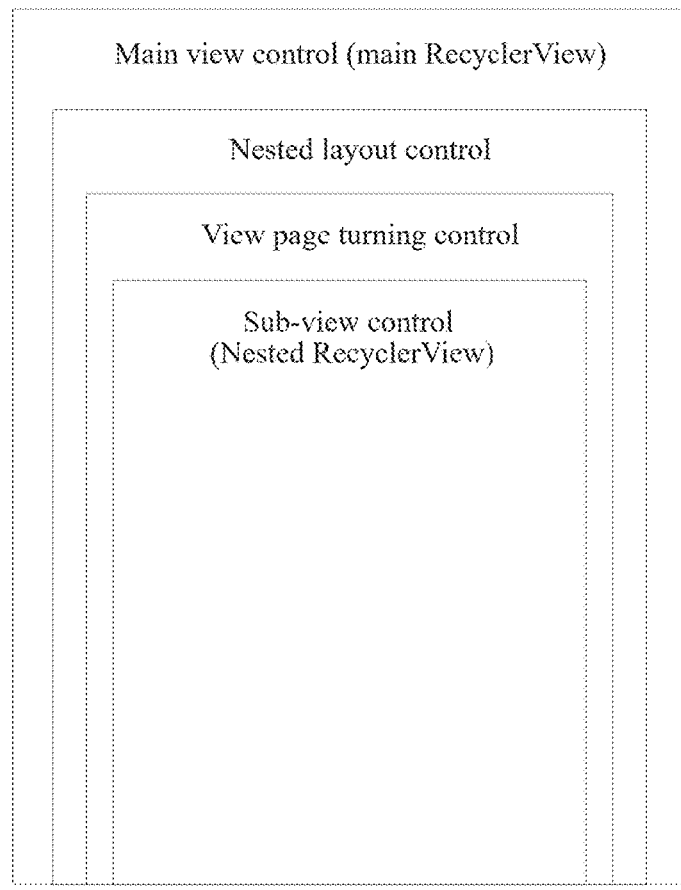
FIG. 2 shows a schematic diagram of a nesting relationship of various controls in an information display page provided by some embodiments of the present disclosure.

The main view control may specifically be a control of the recycler view (RecyclerView) type. Hereinafter, the main view control is represented by the main RecyclerView. As shown in FIG. 2, it is a schematic diagram of a nesting relationship of various controls in an information display page provided by some embodiments of the present disclosure, which includes a main view control (main RecyclerView), a nested layout control (NestedChildLayout), and a view page turning control (ViewPager2) and a sub-view control (nested RecyclerView). ViewPager2 may include multiple preset information flow tabs. For example, the information flow tabs deployed by ViewPager2 may be information flow tab1 and information flow tab2. Under different information flow tags, nested RecyclerView is used to realize the feed stream of corresponding multimedia content under the information flow tag. During specific implementation, the number of information flow tabs deployed in ViewPager2 may be set according to actual business needs. The page information display method of the embodiments of the present disclosure will be described in detail below with reference to FIG. 2:

The first area may be an area between the top of the information display page and the top of NestedChildLayout. The first view information is the information displayed in the first area, which may also be referred to as the content of the main RecyclerView. The first view information may change into multimedia content under the information flow tab as various controls in the information display page slide.

Figure 3:
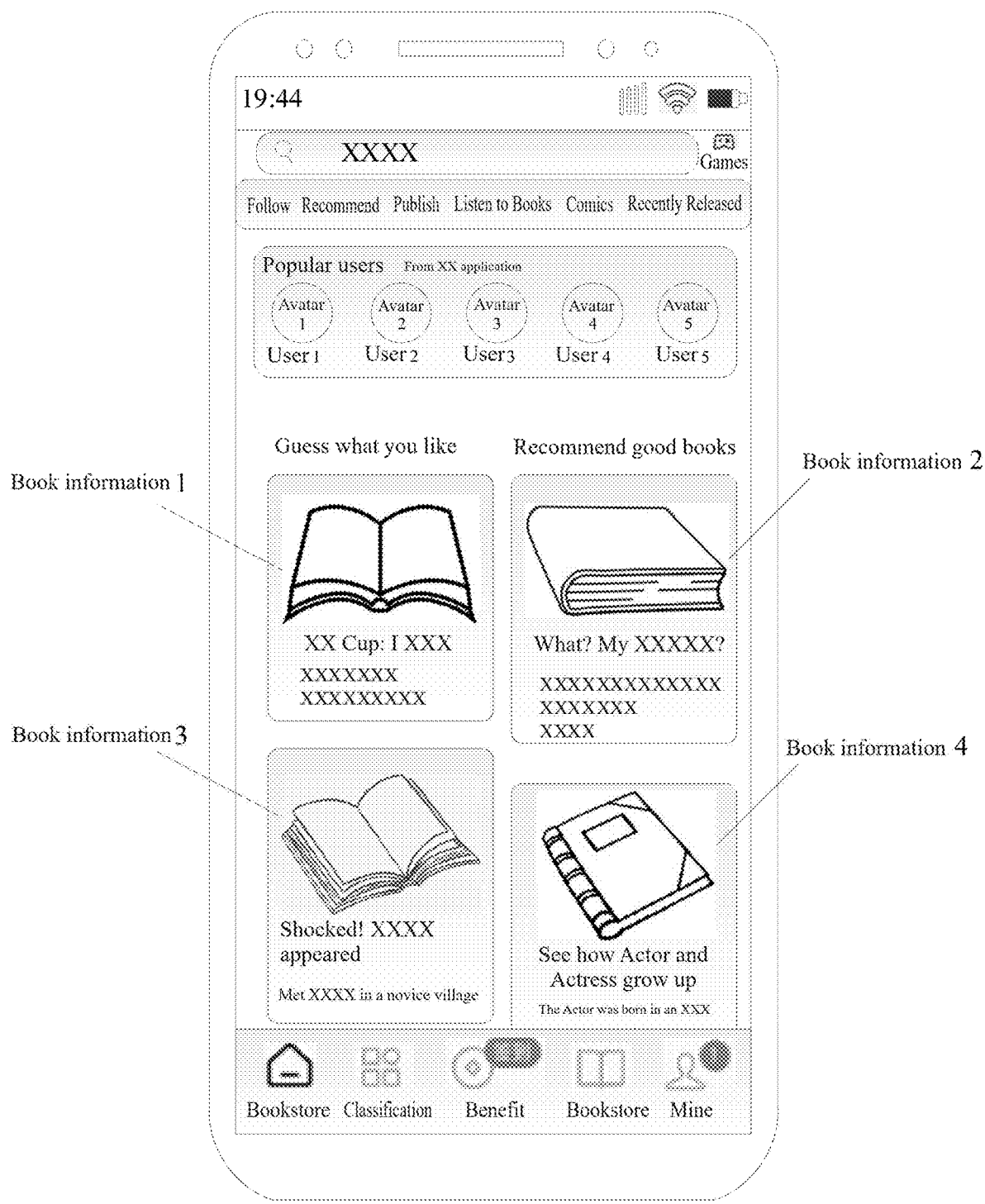
FIG. 3 shows a schematic diagram of an information display page provided by some embodiments of the present disclosure.

In different application scenarios, information flow tabs deployed with ViewPager2 are different, and the types of information under the information flow tabs are also different. As shown in FIG. 3, it is a schematic diagram of an information display page provided by some embodiments of the present disclosure. Wherein, FIG. 3 is a kind of page in a book reading scenario. In FIG. 3, vertical tabs may include a follow tab, a recommendation tab, a publishing tab, a listening books tab, a comics tab, and a recently released tab. Wherein, the recommendation tab is a target vertical tab triggered, the first view information may be the information corresponding to the area where popular users are located, and the information flow tab includes a guess-what-you-like tab and a recommend good book tab. The currently selected information flow tab is the guess-what-you-like tab, and in a nested RecyclerView under the guess-what-you-like tab, information of various books is displayed, that is, book information 1 to book information 4.

Exemplarily, first view information may be determined in response to a trigger operation for a target vertical tag in an information display page, and the first view information may be displayed in a first area of the information display page through the main RecyclerView.

S102: laying out a view page turning control in the main view control through a nested layout control nested in the main view control, and nesting a sub-view control in the view page turning control.

Here, the nested layout control is NestedChildLayout in FIG. 2, which can establish an association relationship between the main RecyclerView and the nested RecyclerView under the information flow tab. The view page turning control is ViewPager2 in FIG. 2, in which various information flow tabs may be deployed, and smooth switching between information flow tabs may be achieved, achieving the effect of smooth page turning. The sub-view control is the nested RecyclerView under the information flow tab, and one information flow tab corresponds to one nested RecyclerView.

During specific implementation, the ViewPager2 under the main RecyclerView may be determined through a get child index (i.e. getChildAt (index)) method in the Nested Child Layout, and the ViewPager2 may be laid out in NestedChildLayout. Here, since NestedChildLayout is laid out in the main RecyclerView, ViewPager2 is also deployed in the main RecyclerView. At the same time, through the getChildAt (index) method, it is possible to determine the nested RecyclerView associated with the main RecyclerView and nest the nested RecyclerView in the ViewPager2.

S103: displaying a plurality of information flow tags through the view page turning control, and displaying each multimedia content corresponding to the selected information flow tag in a second area of the information display page through the sub-view control; the multimedia content constituting second view information; wherein, in different sliding states for performing a sliding operation on the information display page, page sliding is controlled through different view controls, and the sliding states are used to indicate whether the first view information is slid out of the current page display range; the different view controls include the main view control and the sub-view control.

Here, the information flow tab is the information flow tab. After a target vertical tab is triggered, the selected information flow tab may be the default information flow tab among the multiple information flow tabs in the view page turning control, for example, the guess-what-you-like tab in FIG. 3. After that, in response to the user's selection of any information flow tab among the multiple information flow tabs displayed on the view page turning control other that the currently displayed information flow tab, each multimedia content corresponding to the triggered information flow tag may be displayed on the information display page through nested RecyclerView. Each multimedia content corresponding to the information flow tag may constitute second view information.

During specific implementation, while determining ViewPage2 under the main RecyclerView, each information flow tab deployed in the ViewPager2 may also be determined, and multiple information flow tabs may be displayed through the view page turning control. Here, one information flow tab may correspond to one nested RecyclerView. If the information flow tab includes multiple, the associated nested RecyclerView found at this time may include multiple. But in order to quickly locate one nested RecyclerView associated with the main RecyclerView and to display content in the one nested RecyclerView, a screen page offset limit value of the view page turning control (i.e., ViewPager2.mOffscreenPageLimit) may be set to a default screen offset value (i.e., OFFSCREEN_PAGE_LIMIT_DEFAULT). Exemplarily, OFFSCREEN_PAGE_LIMIT_DEFAULT may be preset to −1. In this way, after triggering a target vertical tag, it is possible to quickly locate one information flow tab and determine the nested RecyclerView under the information flow tab. Then, each multimedia content corresponding to the positioned information flow tab may be displayed in a second area of the information display page through the nested RecyclerView.

Exemplarily, as for FIG. 3, after triggering the recommendation tab, it is possible to quickly locate the guess-what-you-like tab, and display information of various books in the nested RecyclerView under the guess-what-you-like tab. Wherein, the information displayed by the nested RecyclerView may be feed stream information, which may be continuously refreshed.

It should be noted that the above S101 to S103 may be steps executed simultaneously. After responding to the trigger operation for the target vertical tag, the first view information and the multiple information flow tags and each multimedia content corresponding to the selected information flow tag may be synchronously displayed in the information display page. For example, after responding to triggering the recommendation tab in FIG. 3, the information display page shown in FIG. 3 may be directly displayed.

Further, after displaying each multimedia content corresponding to the selected information flow tag in the second area of the information display page through the sub-view control, it is possible to control page sliding through different view controls in different sliding states that perform sliding operations on the information display page. That is to say, after the user slides on the information display page, the page may be displayed smoothly by flexibly switching using the main RecyclerView and the nested RecyclerView according to the actual sliding state of the page.

Wherein, the sliding state is used to refer to whether the first view information is slid out of the current page display range. Exemplarily, in a case that the first view information is slid out of the current page display range, a touch event of the screen may be held by the nested RecyclerView. At this time, the nested RecyclerView may be used to control page sliding. In a case that the first view information does not slide out of the current page display range, the touch event of the screen may be held by the main RecyclerView. At this time, the main RecyclerView may be used to control page sliding. The current page display range may specifically be a page area located under the vertical tabs on the information display page.

In this way, by nesting a layout control in a main view control, it can not only realize to associate the main view control with information nested in the layout control, but also locate to the information nested in the layout control with almost zero performance loss. Since a view page turning control including an information flow tab (that is, information flow tab) is nested in the layout control and a sub-view page control is nested in the view page turning control, an accurate association between the main view control and the information flow tab in the view page turning control and the sub-view control under the information flow tab is realized through the layout control, that is, it is possible to realize that, when a target vertical tab is triggered, not only can the sub-view control be quickly located, but also resource consumption can be reduced, thereby enabling more resources to be used to refresh multimedia content in sub-view controls, effectively solving the problem of stuck in refreshing the feed stream. Since the view page turning control has reliable view switching performance, it is possible to realize smooth switching between multiple information flow tabs by deploying the multiple information flow tabs in the view page turning control, thereby improving the page turning effect. By deploying different styles of multimedia content and arranging them in different arrangements through sub-view controls under different information flow tabs, it is possible to effectively improve the diversity of information display. In addition, by flexibly switching between the main view control and the sub-view control to control page sliding in different sliding states, it is possible to further improve the smoothness of page sliding.

In some embodiments, the sliding operation performed on the information display page may include a first sliding operation. The first sliding operation is a page drag operation, that is, a operate that drags a certain distance on the information display page. In a case that a sliding state indicates that the first view information has not been slid out of the current page display range, it means that the first view information displayed in the first area can always appear in the current page display range during sliding, and at the same time, it means that during the entire sliding operation, the touch event is always held by the main RecyclerView. In this case, after executing the above S103, it is possible to slide page according to following steps:

in response to the first sliding operation, controlling the first view information to slide in a first sliding direction according to a first sliding distance through the main view control.

Here, the first sliding direction is a sliding direction corresponding to the first sliding operation, which may specifically be upward sliding or downward sliding. The first sliding distance is a sliding distance corresponding to the first sliding operation.

During specific implementation, in response to the first sliding operation on the information display page shown in FIG. 3 by the user, controlling the first view information to slide in the first sliding direction according to the first sliding distance through the main view control.

Then, in response to a nested scrolling enable command, controlling the multimedia content displayed in the second area to slide in the first sliding direction according to the first sliding distance; wherein, there are changes to the information displayed in the first area and in the second area before and after sliding.

Here, the nested scrolling enable command (that is, the setNestedScrollingEnable command) is a command for the user to control the information in the nested RecyclerView associated with the main RecyclerView to slide, because the first view information has not been slid out of the current page display range, so the value of the nested scrolling enable command satisfies a first preset value (specifically, true). Therefore, it is possible to control the multimedia content in the nested RecyclerView to slide in the first sliding direction according to the first sliding distance directly using the nested scrolling enable command.

Figure 4:
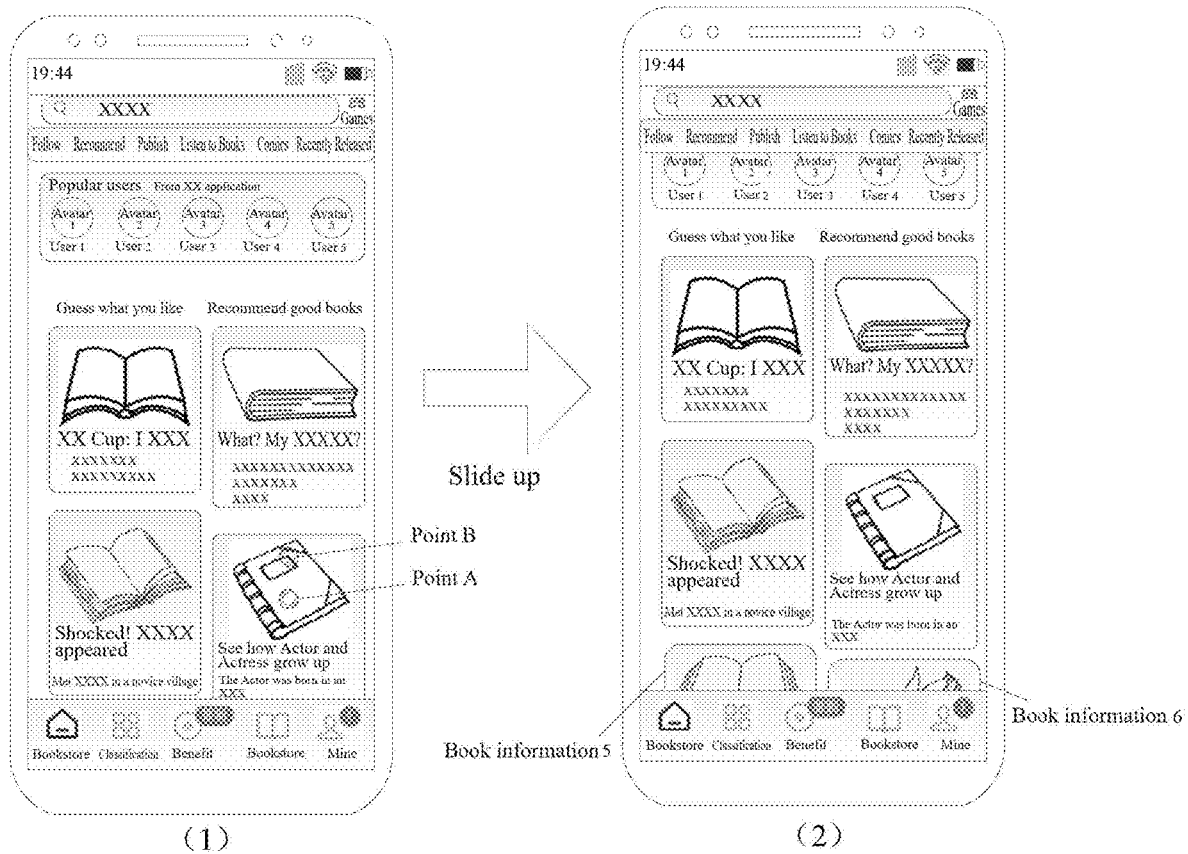
FIG. 4 shows a schematic diagram of comparison before and after page sliding provided by some embodiments of the present disclosure.

As shown in FIG. 4, it is a schematic diagram of comparison before and after page sliding provided by some embodiments of the present disclosure, wherein (1) in FIG. 4 is the information display page before responding to the first sliding operation, and (2) in FIG. 4 is the information display page after responding to the first sliding operation. Wherein, the first sliding operation is upward sliding, the first sliding direction is upward, and the first sliding distance is the distance between point A and point B in (1). Wherein, (2) compared to (1), the position corresponding to the first view information controlled by the main RecyclerView moves upward, corresponding information content decreases, the positions of the two information flow tabs displayed in the view page turning control move upward, and the position of the multimedia content corresponding to the nested RecyclerView moves upward, and more multimedia content is displayed. Based on (1) and (2) in FIG. 4, it can be seen that there are obvious changes in the information displayed in the first area and the second area before and after sliding. Wherein, the first view information displayed in the first area decreases, and the multimedia content displayed in the second area increases, and book information 5 and book information 6 appear in FIG. 2.

In some embodiments, a sliding operation performed on an information display page may also include a second sliding operation on a first preset direction, and the second sliding operation is also a page drag operation. Wherein, the first preset direction may specifically be an upward direction. During sliding upward, first view information may be slid out of current page display range. That is, a sliding state will be a state indicating that the first view information is slid out of the current page display range. In this case, after executing the above S103, it is possible to slide page according to following steps:

S1: in response to a second sliding operation, controlling the first view information to slide in the first preset direction according to currently dragged first distance in a second sliding distance through the main view control.

Here, the second sliding distance is the total sliding distance corresponding to the second sliding operation. Since the sliding operation is a continuous operation, real-time response is required during the entire sliding operation. Therefore, when responding to the second sliding operation, page sliding control needs to be performed according to currently dragged first distance, until the currently dragged first distance is equal to the second sliding distance, then the second sliding operation ends, and the page sliding ends accordingly. Wherein, the first distance that has been dragged currently may be recorded using a on scrolling onScrolled(dx, dy) method. Wherein, onScrolled(dx, dy) is used to record the distance moved by a touch. The distance moved by the touch is the distance currently dragged first distance. dx represents the sliding distance in the horizontal direction of the page, and dy represents the sliding distance in the vertical direction of the page. Here, under ideal circumstances, since when the user slides a page, it may affect the sliding of the page in both the horizontal direction and the vertical direction of the page, so dx and dy exist. However, for example, as for the sliding of the displayed information display page such as shown in FIG. 3, even if the actual sliding operation by the user causes displacement in both the horizontal direction of the page and the vertical direction of the page, the displacement in the horizontal direction of the page may be ignored. The page is controlled to be slid only in the vertical direction according to the displacement in the vertical direction of the page caused by the sliding operation. Therefore, during specific implementation, the dx recorded in the onScrolled(dx, dy) method may always remain 0.

Since in the process of responding to the second sliding operation, the first view information is gradually slid out of the current page display range, so at the initial moment of responding to the second sliding operation, the first view information must be located in the current page display range. At this time, it can also mean that the touch event is held by the main RecyclerView.

In specific implementation, in response to the second sliding operation of sliding upward, the first view information may be controlled to slide upward in the upward direction according to the first distance that has been currently dragged through the main RecyclerView, and at the same time, it is possible to use onScrolled(dx, dy) to record the currently dragged first distance in real time.

S2: in response to the first view information being slid out of the current page display range, sliding the multimedia content displayed in the second area through an offset sliding method corresponding to the sub-view control according to the remaining sliding distance in the second sliding distance; wherein, each multimedia content corresponding to the information flow tag is displayed in the first area after sliding, and the multimedia content displayed in the second area changes; the remaining sliding distance being equal to the difference between the second sliding distance and the first distance.

Here, the remaining sliding distance may be the difference between the second sliding distance and the first distance. Since the first view information is slid out of the current page display range, after the second sliding operation is completed, the multimedia content corresponding to the information flow tab will be displayed in the first area. At the same time, the multimedia content displayed in the second area will also have changed. The offset sliding method may be the RecyclerView.scrollBy(deltaX, deltaY) method for the user to control information in the sub-view control to slide, wherein deltaX represents the offset that the sub-view control needs to slide in the horizontal direction of the page, deltaY represents the offset that the view control needs to slide in the vertical direction of the page. However, as for the sliding of the information display page such as shown in FIG. 3, deltaX can always remain 0.

During specific implementation, in the process of executing S1, at a certain moment, the first view information is slid out of the current page display range, and then, in response to the first view information being slid out of the current page display range, it is possible to determine at the moment that the nested RecyclerView needs to be slid, and the multimedia content displayed in the second area may be slid through the RecyclerView.scrollBy(deltaX, deltaY) method corresponding to the nested RecyclerView according to the remaining sliding distance in the second sliding distance, thereby realizing feed stream updating of the multimedia content displayed in the second area. Wherein, the remaining sliding distance may include deltaX and deltaY, and the included deltaX is 0.

Moreover, when controlling the sliding of the multimedia content displayed in the second area through the RecyclerView.scrollBy(deltaX, deltaY) method, it is also necessary to call the motion event offset location method (MotionEvent.offsetLocation(deltaX, deltaY) method) to record the main RecyclerView, on a touch scrolling event (i.e. onTouchEvent), after the first view information is slid out of the current page display range, the displacements of the second sliding operation in the horizontal and vertical directions of the page. Wherein, deltaX in the MotionEvent.offsetLocation(deltaX, deltaY) method may be 0, and deltaY may be the remaining sliding distance.

In this way, by recording the offset of the main RecyclerView in onTouchEvent through the MotionEvent.ofsetLocation(deltaX, deltaY) method, it is possible that, after the first view information is slid out of the current page display range, if there is a sliding operation for a second preset direction, the first view information may be stably and smoothly slid into the current page display range according to the offset recorded in the MotionEvent.offsetLocation (deltaX, deltaY) method, the problem of large page jitters when reaching the top of the nested RecyclerView could be alleviated.

Figure 5:
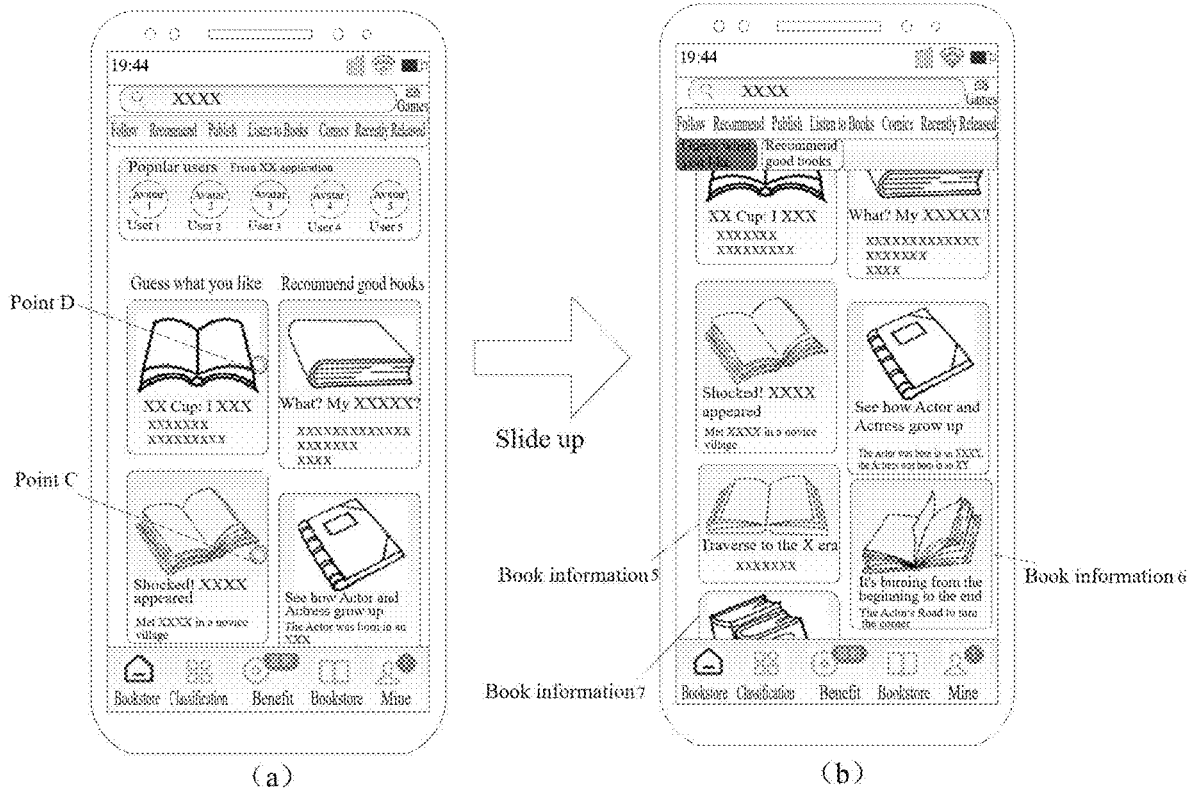
FIG. 5 shows a schematic diagram of comparison before and after another page sliding provided by some embodiments of the present disclosure.

As shown in FIG. 5, it is a schematic diagram of comparison before and after another page sliding provided by some embodiments of the present disclosure, wherein a in FIG. 5 is the information display page before responding to the second sliding operation, and b in FIG. 5 is the information display page after responding to the second sliding operation. Wherein, the second sliding operation is upward sliding, the second sliding direction is the first preset direction, and the second sliding distance is the distance between C and D in a. Wherein, b compared to a, the information displayed in the first area changes from the first view information to each multimedia content corresponding to the information flow tags, the two information flow tabs displayed in the view page turning control become a ceiling state, and some of the multimedia content is slid out of the current page display range (for example, some areas of book information 1 and book information 2 are slid out of the current page display range), the position of the multimedia content corresponding to the nested RecyclerView moves upward, and more multimedia content is displayed, and book information 7 appears.

In some embodiments, after executing the above S2, a situation as shown in b in FIG. 5 may occur, that is, the information displayed in the first area is also various multimedia content corresponding to the information flow tags. At this time, the touch event may be held by the nested RecyclerView. In this case, if the user performs a sliding operation in a second preset direction on the information display page, a situation may occur that the first view information is re-slid into the first area. In this case, it is possible to perform page sliding according to following steps:

P1: in response to a third sliding operation for a second preset direction, sliding the displayed multimedia content in the second preset direction according to currently dragged second distance in a third sliding distance through the sub-view control.

Here, the second preset direction may be the opposite direction of the first preset direction. Exemplarily, the second preset direction may be a downward direction. During sliding down, the first view information may reappear in the current page display range. Specifically, the third sliding operation may be an operation of sliding down the information display page, and the third sliding distance is the sliding distance corresponding to the third sliding operation. The slid distance of the multimedia content is the length of the slid multimedia content. In a case that the slid distance is less than a third sliding distance, it is necessary to re-slide the disappeared first view information to the first area to satisfy the third sliding distance.

Since the sliding operation is a continuous operation, real-time response is required during the entire sliding operation. Therefore, when responding to the third sliding operation, page sliding control needs to be performed according to the currently dragged second distance, until the currently dragged second distance is equal to the third sliding distance, then the third sliding operation ends, and the page sliding will also end accordingly. Wherein, the currently dragged second distance is the sliding distance corresponding to the currently executed sliding operation in the third sliding operation.

During specific implementation, in response to the third sliding operation of sliding downwards, in a case that the sliding distance of the multimedia content is less than the third sliding distance, it is possible to slide the multimedia content displayed on the information display page in the downward direction according to the currently dragged second distance through the nested RecyclerView.

P2: in response to the first view information being slid to the current page display range, in response to the communication between a nested scrolling child interface of the sub-view control and a nested scrolling parent interface of the main view control, controlling the first view information to slide according to the difference between the third sliding distance and the second distance using a nested scroll command.

Here, the second distance used when determining the above difference is the second distance dragged when the first view information is slid to the current page display range.

The nested scrolling child interface of the sub-view control may be the nested scrolling child interface 2 (NestedScrollingChild2) and the nested scrolling child interface 3 (i.e., NestedScrollingChild3) corresponding to the nested RecyclerView. The nested scrolling parent interface of the main view control may be the nested scrolling parent interface 2 (NestedScrollingParent2) and the nested scrolling parent interface 3 (NestedScrollingParent3) corresponding to the main RecyclerView. Wherein, the NestedScrollingChild2 interface can communicate with the NestedScrollingParent2 interface, and the NestedScrollingChild interface 3 can communicate with the NestedScrollingParent3 interface.

The nested scroll command may be an on nested scroll command (onNestedScroll(target, dxConsumed, dyConsumed, dxUnconsumed, dyUnconsumed) command, wherein, target represents the difference between the third sliding distance and the second distance is needed, dxConsumed represents the distance consumed by the nested RecyclerView in the horizontal direction of the page, dyConsumed represents the distance consumed by the nested RecyclerView in the vertical direction of the page.dxUnconsumed represents the unconsumed distance of the nested RecyclerView in the horizontal direction of the page.dyUnconsumed represents the unconsumed distance of the nested RecyclerView in the vertical direction of the page. Specifically, dxConsumed may be 0, dyConsumed may be equal to the second distance dragged when the first view information is slid to the current page display range, dxUnconsumed may be 0, and dyUnconsumed may be the above difference.

During specific implementation, in response to the first view information being slid to the current page display range, that is, in response to sliding down to the top of the nested RecyclerView, the NestedScrollingChild2 interface and the NestedScrollingChild3 interface may be called to communicates with the NestedScrollingParent2 interface and the NestedScrollingParent3 interface. Then, using the onNestedScroll(target, dxConsumed, dyConsumed, dxUnconsumed, dyUnconsumed) command to call the RecyclerView.scrollBy(dxUnconsumed, dyUnconsumed) method, the first view information is controlled to slide according to the difference between the third sliding distance and the second distance. When controlling the sliding of the first view information, the nested RecyclerView may continue to control the sliding of the multimedia content according to the above difference.

Further, if all the first view information is re-slid to the first area and the third sliding operation is still not ended, the sliding distance of the first view information may be determined, that is, the sliding distance that the main RecyclerView has consumed may be determined. Then, the remaining distance to be consumed may be determined according to the difference between the above difference and the sliding distance that has been consumed by the main RecyclerView. The dispatch nested scrolling method (i.e., dispatchNestedScroll(myConsumedDx, myConsumedDy, myUnconsumedDx, myUnconsumedDy) method) is called to pass the remaining distance to be consumed to other Views that implement the NestedScrollingParent3 and NestedScrollingParent2 interfaces, and use these Views to consume the remaining distance to be consumed, thus achieving completely consuming of the third sliding distance and completing an accurate response to the third sliding operation. Wherein, myConsumedDx can always be 0, myConsumedDy represents the distance that other Views have consumed in the vertical direction of the page, myUnconsumedDx can always be 0, and myUnconsumedDy represents the distance that other Views have not consumed in the vertical direction of the page. Wherein, myUnconsumedDy can start to grow from 0, and the maximum growth is to the remaining distance to be consumed, and myUnconsumedDy can start to decrease from the remaining distance to be consumed until it drops to 0.

In addition, in a case that the touch event is held by the nested RecyclerView, if the user performs a sliding operation in the second preset direction on the information display page, but the first view information does not re-slide back to the first area, it is possible to use the nested RecyclerView to control page sliding and realize refreshing of multimedia content.

In some embodiments, due to a page drag operation and a page scroll operation below, there will be a situation that, in a case that the main RecyclerView inherits the nested RecyclerView, it appears that the first view information that has disappeared from the current page display range will slide back to the current page display range. Therefore, in order to facilitate distinguishing the causes of the above situation, that is, to distinguish between the page drag operation and the following page scroll operation, the step "controlling the first view information to slide according to the difference between the third sliding distance and the second distance" in the above P2 may be implemented in following steps:

P2-1: acquiring a target field used to indicate a page scrolling state; the page scrolling state being a state that, after in response to a page scrolling operation, controlling the information display page to slide, it is necessary to continue to scroll the information display page according to the page sliding speed at the end of the page sliding.

Here, the page scrolling state is a state in which after controlling the information display page to slide in response to the page scrolling operation, it is still necessary to continue to control the information display page to automatically scroll a certain distance according to the page sliding speed when the page sliding ends. Specifically, the page scrolling state is a fling state, and the page scrolling operation is a page fling operation. The target field may be a nested scroll (mNestedFling) field. The mNestedFling field may include two values, one is a true field for indicating that the page is in the fling state, and the other is a false field that indicates that the page is in a dragging state. Specifically, when the main RecyclerView calls the fling(velocityX, veloctyY) command, the value of the mNestedFling field may be set to true, and at the end of the fling(velocityX, veloctyY) command call, the value of the mNestedFling field may be set to false.

During specific implementation, in the process of controlling the sliding of the first view information using the onNestedScroll(target, dxConsumed, dyConsumed, dxUnconsumed, dyUnconsumed) command according to the difference between the third sliding distance and the second distance, it is possible to first acquire the mNestedFling field.

P2-2: in a case that the target field indicates that the page scrolling state is a closed state, controlling the first view information to slide according to the difference.

Here, the page scrolling state being a closed state means a state in which the value of the mNestedFling field is false. The page scrolling state being an on state means a state in which the value of the mNestedFling field is true.

During specific implementation, in a case that the value of the mNestedFling field is false, the first view information may be controlled to slide by using the onNestedScroll (target, dxConsumed, dyConsumed, dxUnconsumed, dyUnconsumed) command according to the above difference.

On the contrary, in a case that the target field indicates that the page scrolling state is in an on state, the page sliding may be controlled according to the method described below.

In some embodiments, the sliding operation may also include a page scrolling operation, wherein the page scrolling operation may also be referred to a page fling operation (i.e., page fling operation). The page scrolling operation may include a scrolling operation for a first preset direction and a scrolling operation for a second preset direction, due to the processing procedure of the scrolling operation for the first preset direction and the process type of the scrolling operation for the second preset direction, the following will take the page scrolling operation for the first preset direction as an example for detailed explanation:

Specifically, in a case that the user initiates a page scrolling operation for a first preset direction, first view information may be slid out of the current page display range, that is, a sliding state may indicate a state that the first view information is slid out of the current page display range. In this case, after executing the above S103, the page sliding may be performed according to the following steps:

T1: in response to the page scrolling operation for the first preset direction, determining a first inherited sliding speed of the information display page when the page scrolling operation ends.

Here, the end of the page scrolling operation is when the touch operation by the user ends, that is, when the user's finger leaves the screen after sliding. The first inherited sliding speed is the speed that the main RecyclerView in the information display page needs to inherit when the page scrolling operation ends. The main RecyclerView may automatically control the page to scroll according to the first inherited speed.

During specific implementation, in response to the page scrolling operation for the first preset direction, the first view information is controlled to slide through the main RecyclerView according to the drag distance before the page scrolling operation ends, and then, after the page scrolling operation ends, the first inherited sliding speed of the information display page may be determined.

T2: determining the total distance to be slid according to the first inherited sliding speed.

Here, the total distance to be slid is the distance that the information display page needs to automatically scroll.

Exemplarily, according to the first inherited sliding speed and a friction parameter when the page slides, the total distance that the page needs to automatically scroll may be determined.

T3: controlling page sliding according to the first inherited sliding speed and the total distance to be slid through the main view control.

Exemplarily, the sliding of the first view information is controlled through the main RecyclerView by using the recycler view fling (RecyclerView.fling(velocityX, velocityY)) method according to the first inherited sliding speed. Wherein, velocityX represents the inheritance speed in the horizontal direction of the page, and velocityY represents the inheritance speed in the vertical direction of the page. In the embodiments of the present disclosure, velocityX may be 0, and velocityY may be equal to the first inherited sliding speed.

If the main RecyclerView controls the sliding distance of the first view information to be not less than the total distance to be slid, it is possible to control the automatic sliding of the page only through the main RecyclerView, and utilize a nested scrolling enable command to adaptively control the multimedia content to slide in the first preset direction.

If the main RecyclerView controls the sliding distance of the first view information to be less than the total distance to be slid, it is possible to control the overall sliding of the page only through the main RecyclerView and by controlling the nested RecyclerView, until sliding to the above total distance.

In some embodiments, above T3 may be implemented according to the following steps:

T3-1: determining a target sliding distance for controlling the sliding of the first view information according to the first inherited sliding speed.

Here, the target sliding distance is the total sliding distance when sliding out of the current page display range from the current state without exceeding the first view information.

Before sliding using the RecyclerView.fling(velocityX, velocityY) method according to the first inherited sliding speed, it may be determined, according to the first inherited sliding speed, the friction parameter when the page slides, and the total consumable distance of the main RecyclerView, the target sliding distance for the first view information to slide controlled through the main RecyclerView.

T3-2: in a case that the target sliding distance is less than the total distance to be slid, determining a second inherited sliding speed after sliding the target sliding distance.

Exemplarily, in a case that the target sliding distance is less than the total distance to be slid, it means that the main RecyclerView cannot consume all the total distance needed to control the automatic sliding of the page after the page scrolling operation ends. Therefore, it is necessary to nest the RecyclerView for sliding, thereby completely consuming the total distance and achieving accurate response to the page scrolling operation. The second inherited sliding speed is the sliding speed integrated with the nested RecyclerView.

For the nested RecyclerView, it is necessary to determine whether the nested RecyclerView needs to continue to automatically scroll after the main RecyclerView automatically scrolling ends. Specifically, since the main RecyclerView will consume a certain distance, the consumed distance being the above target sliding distance, when determining whether the nested RecyclerView needs to continue to automatically scroll, it is also necessary to determine whether the recorded first inherited speed may be completely consumed by the main RecyclerView, if it is, that is, the target sliding distance is greater than the total distance, there is no need for the nested RecyclerView to continue to automatically scroll; if not, the nested RecyclerView is needed to use the second inherited speed again to continue automatic scrolling.

During specific implementation, since the nested RecyclerView needs to continue to control sliding, it is necessary to calculate the sliding speed inherited when the nested RecyclerView controls sliding, and because when the main RecyclerView uses the first inherited sliding speed to perform sliding control, the first inherited sliding speed will be smaller and smaller due to sliding friction existence, so when it is the turn for the nested RecyclerView to control automatic sliding, there will be an inherited sliding speed of information, that is, the second inherited sliding speed.

Exemplarily, an inverse function of the calculated speed may be used to determine the second inherited sliding speed according to the target sliding distance.

T3-3: in response to the first view information being slid out of the current page display range, sliding the displayed multimedia content according to the second inherited sliding speed.

During specific implementation, when controlling the page sliding through the main RecyclerView using the RecyclerView.fling (velocityX, velocityY) method according to the first inherited sliding speed, every time the page slides one pixel, the onScrolled (dx, dy) method may be used to record the distance the page has currently scrolled. At the same time, every time the onScrolled(dx, dy) method is called, it may be determined whether the first view information has been slid out of the current page display range. Specifically, a preset determination condition (that is, no more vertical sliding !canScrollVertically(1)) may be used to determine whether the first view information is slid out of the current page display range. In a case that !canScrollVertically(1) is satisfied, it may be determined that the first view information is slid out of the current page display range.

It should be noted that the reason why the determination condition needs to be used is determined when considering issues related to the timing of scrolling inheritance. Exemplarily, generally speaking, the timing of scrolling inheritance may be inherited when the main RecyclerView is stationary. However, in a bookstore scenario, the static determination of the main RecyclerView, that is, the main recycler view state (RecyclerView.state) being equal to the recycler view scrolling state idle (that is, RecyclerView.SCROLL_STATE_IDLE), will lag 1 to 2 s, so this condition cannot be used for determination. Therefore, during specific implementation, the above determination condition (i.e., !canScrollVertically(1)) need to be set to determine the inheritance timing of the nested RecyclerView.

Further, through the continuous sliding of the first view information in the main RecyclerView, the first view information will inevitably be slid out of the current page display range at a certain moment. At this time, if the target sliding distance is less than the total distance to be slid, it is possible to, in response to the first view information being slid out of the current page display range, find the nested RecyclerView corresponding to the main RecyclerView. Then, the current sliding distance of the page recorded by the onScrolled(dx, dy) method may be reset to 0 to serve the next page scrolling operation. At the same time, the nested RecyclerView.fling (velocityX, velocityY) method may be called to slide the multimedia content currently displayed in the information display page according to the second inherited sliding speed until the target sliding distance and the sliding distance of the nested RecyclerView.fling after using the second inherited sliding speed are equal to the total distance to be slid, then it is determined that the response to the page scrolling operation is completed.

In addition, regarding the page scrolling operation for the second preset direction, in a case that the first view information is re-slid to the current page display range, it is possible to perform automatic scrolling first through the nested RecyclerView by calling the nested RecyclerView.fling(velocityX, velocityY) method. In a case that the automatic scrolling distance of the nested RecyclerView is not less than the total distance to be slid corresponding to the page scrolling operation in the second preset direction, it is possible to only use the nested RecyclerView to control the multimedia content to slide. On the contrary, in a case that the automatic scrolling distance of the nested RecyclerView is less than the total distance to be slid corresponding to the page scrolling operation in the second preset direction, it means that the main RecyclerView needs to continue to automatically scroll after the automatic scrolling of the nested RecyclerView ends. Therefore, it is possible to determine the speed that the main RecyclerView needs to inherit after the automatic scrolling of the nested RecyclerView ends, and then control the page to slide by using the RecyclerView.fling(velocityX, velocityY) method according to the speed that needs to be inherited, until an accurate response to the page scrolling operation for the second preset direction is completed.

Those skilled in the art can understand that in the above methods of the specific embodiments, the writing order of each step does not mean a strict execution order and constitutes any limitation on the implementation process. The specific execution order of each step should be determined based on its function and possible internal logic.

Based on the same inventive concept, the embodiments of the present disclosure further provides a page information display apparatus corresponding to the page information display method. Since the problem-solving principle of the apparatus in the embodiments of the present disclosure is similar to the above page information display method in the embodiments of the present disclosure, the implementation of the apparatus may be referred to the implementation of the method, which will not be repeated here again.

Figure 6:
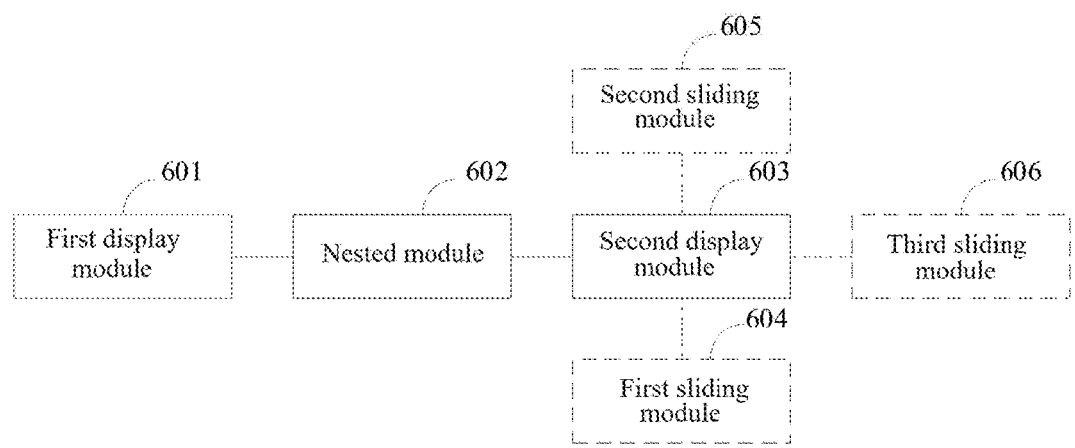
FIG. 6 shows a schematic diagram of a page information display apparatus provided by some embodiments of the present disclosure.

As shown in FIG. 6, it is a schematic diagram of a page information display apparatus provided by some embodiments of the present disclosure, comprising:

a first display module 601 configured to display first view information in a first area of an information display page through a main view control in response to a trigger operation for a target vertical tag;

a nested module 602 configured to layout a view page turning control in the main view control through a nested layout control nested in the main view control, and nest a sub-view control in the view page turning control;

a second display module 603 configured to display a plurality of information flow tags through the view page turning control, and display each multimedia content corresponding to the selected information flow tag in a second area of the information display page through the sub-view control; the multimedia content constituting second view information;

wherein, in different sliding states for performing a sliding operation on the information display page, page sliding is controlled through different view controls, and the sliding states are used to indicate whether the first view information is slid out of the current page display range; the different view controls include the main view control and the sub-view control.

In one possible implementation, the sliding operation includes a first sliding operation, and in a case that the sliding state indicates that the first view information has not been slid out of the current page display range, the apparatus further comprising:

a first sliding module 604 configured to, after displaying each multimedia content corresponding to the selected information flow tag in the second area of the information display page:

in response to the first sliding operation, control the first view information to slide in a first sliding direction according to a first sliding distance through the main view control;

in response to a nested scrolling enable command, control the multimedia content displayed in the second area to slide in the first sliding direction according to the first sliding distance; wherein, there are changes to the information displayed in the first area and in the second area before and after sliding.

The sliding operation includes a second sliding operation for a first preset direction; in a case that the sliding state indicates that the first view information is slid out of the current page display range, the apparatus further comprising:

a second sliding module 605 configured to, after displaying each multimedia content corresponding to the selected information flow tag in the second area of the information display page:

in response to a second sliding operation, control the first view information to slide in the first preset direction according to currently dragged first distance in a second sliding distance through the main view control;

in response to the first view information being slid out of the current page display range, sliding the multimedia content displayed in the second area through an offset sliding method corresponding to the sub-view control according to the remaining sliding distance in the second sliding distance; wherein, each multimedia content corresponding to the information flow tag is displayed in the first area after sliding, and the multimedia content displayed in the second area changes; the remaining sliding distance being equal to the difference between the second sliding distance and the first distance.

In one possible implementation, the second sliding module 605, is further configured to, after sliding the multimedia content displayed in the second area according to the remaining sliding distance in the second sliding distance:

in response to a third sliding operation for a second preset direction, slide the displayed multimedia content in the second preset direction according to currently dragged second distance in a third sliding distance through the sub-view control;

in response to the first view information being slid to the current page display range, in response to the communication between a nested scrolling child interface of the sub-view control and a nested scrolling parent interface of the main view control, control the first view information to slide according to the difference between the third sliding distance and the second distance using a nested scroll command.

In one possible implementation, the second sliding module 605 is configured to, when controlling the first view information to slide according to the difference between the third sliding distance and the second distance:

acquiring a target field used to indicate a page scrolling state; the page scrolling state being a state that, after in response to a page scrolling operation, controlling the information display page to slide, it is necessary to continue to scroll the information display page according to the page sliding speed at the end of the page sliding;

in a case that the target field indicates that the page scrolling state is a closed state, controlling the first view information to slide according to the difference.

In one possible implementation, the sliding operation includes a page scrolling operation; in a case that the sliding state indicates that the first view information is slid out of the current page display range, the apparatus further comprising:
- a third sliding module 606 configured to, after displaying each multimedia content corresponding to the selected information flow tag in the second area of the information display page:
  in response to the page scrolling operation for the first preset direction, determine a first inherited sliding speed of the information display page when the page scrolling operation ends;
  determine the total distance to be slid according to the first inherited sliding speed;
  control page sliding according to the first inherited sliding speed and the total distance to be slid through the main view control.

In one possible implementation, the third sliding module 606 is configured to, when controlling page sliding according to the first inherited sliding speed and the total distance to be slid:
- determine a target sliding distance for controlling the sliding of the first view information according to the first inherited sliding speed;
- in a case that the target sliding distance is less than the total distance to be slid, determine a second inherited sliding speed after sliding the target sliding distance;
- in response to the first view information being slid out of the current page display range, slide the displayed multimedia content according to the second inherited sliding speed.

For the description of the processing flow of each module in the apparatus and the interaction flow between various modules, it may refer to the relevant descriptions in the above method embodiments, which will not be repeated in detail here again.

Figure 7:
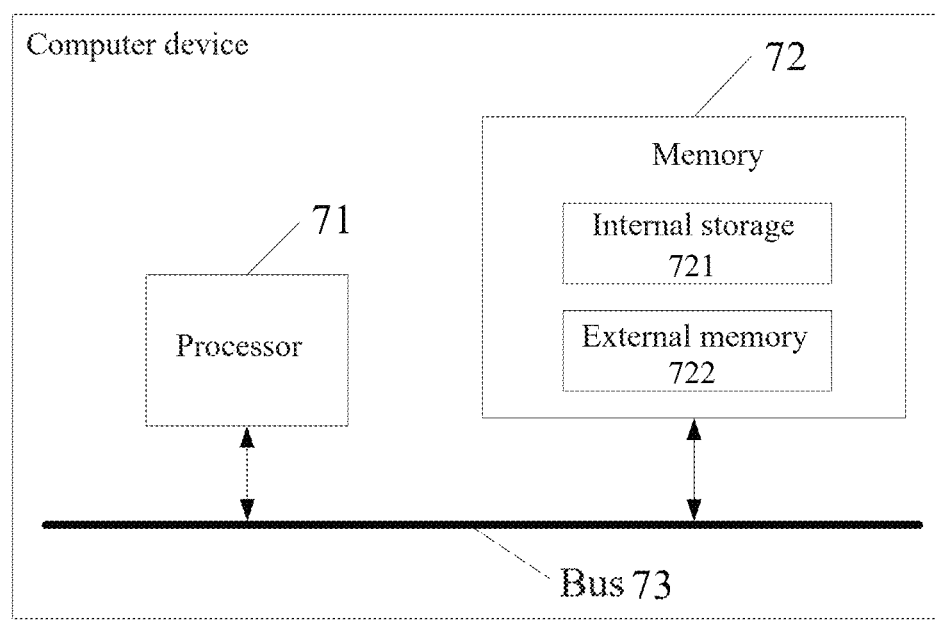
FIG. 7 shows a schematic structural diagram of a computer device provided by some embodiments of the present disclosure.

Based on the same technical concept, some embodiments of the present application further provide a computer device. Referring to FIG. 7, it is a schematic structural diagram of a computer device provided by some embodiments of the present application, comprising:
- a processor 71, a memory 72 and a bus 73. Wherein, the memory 72 stores machine-readable instructions executable by the processor 71, and the processor 71 is configured to execute the machine-readable instructions stored in the memory 72. When the machine-readable instructions are executed by the processor 71, the processor 71 executes the following steps: S101: in response to a trigger operation for a target vertical tag, displaying first view information in a first area of an information display page through a main view control; S102: laying out a view page turning control in the main view control through a nested layout control nested in the main view control, and nesting a sub-view control in the view page turning control; and S103: displaying a plurality of information flow tags through the view page turning control, and displaying each multimedia content corresponding to the selected information flow tag in a second area of the information display page through the sub-view control; the multimedia content constituting second view information; wherein, in different sliding states for performing a sliding operation on the information display page, page sliding is controlled through different view controls, and the sliding states are used to indicate whether the first view information is slid out of the current page display range; the different view controls include the main view control and the sub-view control.

The above memory 72 includes an internal storage 721 and an external memory 722; the internal storage 721 here is also called an internal memory, which is used to temporarily store operation data in the processor 71, and data exchanged with the external memory 722 such as a hard disk. The processor 71 exchanges data with the external memory 722 through the internal storage 721. When the computer device is running, the processor 71 and the memory 72 communicate through the bus 73, so that the processor 71 executes the execution instructions mentioned in the above method embodiments.

Some embodiments of the present disclosure further provides a computer-readable storage medium having a computer program stored thereon, which, when run by a processor, executes the steps of the page information display method in the above method embodiments. Wherein, the storage medium may be a volatile or non-volatile computer-readable storage medium.

The computer program product of the page information display method provided by the embodiments of the present disclosure includes a computer-readable storage medium storing program code. Instructions included in the program code may be configured to execute the steps of the page information display method in the above method embodiment, which may refer to the above method embodiments and will not be repeated here again.

The computer program product may be specifically implemented by hardware, software or a combination thereof. In some embodiments, the computer program product is embodied as a computer storage medium. In some another embodiments, the computer program product is embodied as a software product, such as a Software Development Kit (SDK), etc.

Those skilled in the art can clearly understand that for the convenience and simplicity of description, the specific working process of the above apparatus may be referred to the corresponding process in the foregoing method embodiments, which will not be repeated here again. In the several embodiments provided in this disclosure, it should be understood that the disclosed apparatus and methods may be implemented in other ways. The apparatus embodiments described above are only illustrative. For example, the division of the units is only a logical function division. In actual implementation, there may be other division methods. For another example, multiple units or components may be combined, or some features may be ignored, or not executed. On the other hand, the coupling or direct coupling or communication connection between each other shown or discussed may be through some communication interfaces, and the indirect coupling or communication connection of the apparatus or units may be in the form of electrical, mechanical or other forms. The units described as separate components may or may not be physically separated, and the components shown as units may or may not be physical units, that is, they may be located in one place, or they may be distributed to multiple network units. Some or all of the units may be selected according to actual needs to achieve the purpose of the solution of the embodiments.

In addition, each functional unit in various embodiments of the present disclosure may be integrated into one processing unit, or each unit may exist physically alone, or two or more units may be integrated into one unit.

If the functions are implemented in the form of software functional units and sold or used as independent products, they may be stored in a non-volatile computer-readable storage medium that is executable by a processor. Based on such understanding, the technical solution of the present disclosure is essentially or for the part that contributes to existing technology or the part of the technical solution may be embodied in the form of a software product. The computer software product is stored in a storage medium, including several instructions used to cause a computer device (which may be a personal computer, a server, or a network device, etc.) to execute all or part of the steps of the methods in various embodiments of the present disclosure. While the aforementioned storage media include: U disk, mobile hard disk, Read-Only Memory (ROM), Random Access Memory (RAM), magnetic disk or optical disk and other media that can store program code.

If the technical solution of this application involves personal information, the products applying the technical solution of this application must clearly inform the personal information processing rules and obtain the individual's independent consent before processing personal information. If the technical solution in this application involves sensitive personal information, the products applying the technical solution in this application must obtain the individual's separate consent and meet the requirement of "express consent" at the same time before processing sensitive personal information. For example, setting clear and conspicuous signs at personal information collection apparatus such as cameras to inform that a scope of collecting personal information has been entered, and personal information will be collected, and if an individual voluntarily enters the collection scope, it is deemed to have agreed to the collection of his or her personal information; or on a personal information processing apparatus, in a case that using obvious logos/information to inform personal information processing rules, personal authorization is obtained through pop-up messages or asking individuals to upload their personal information; wherein, personal information processing rules may include personal information processing processors, purposes of personal information processing, processing methods, types of personal information processed, etc.

Finally, it should be noted that the above embodiments are only specific embodiments of the present disclosure, and are used to illustrate, not limit the technical solutions of the present disclosure. The protection scope of the present disclosure is not limited thereto. Although the present disclosure has been described in detail with reference to the foregoing embodiments, those of ordinary skill in the art should understand that any person familiar with the technical field can still make modifications or easily conceive of changes to the technical solutions recorded in the foregoing embodiments within the technical scope disclosed in the present disclosure, or make equivalent substitutions to some of the technical features; and these modifications, changes or substitutions do not cause the essence of the corresponding technical solution to deviate from the spirit and scope of the technical solution of the embodiments of the present disclosure, and they should all be covered within the scope of this disclosure. Therefore, the protection scope of the present disclosure should be defined by the protection scope of the claims.

What is claimed is:

1. A page information display method, comprising:
   in response to a trigger operation for a target vertical tag, displaying first view information in a first area of an information display page through a main view control;
   laying out a view page turning control in the main view control through a nested layout control nested in the main view control, and nesting a sub-view control in the view page turning control;
   displaying a plurality of information flow tags through the view page turning control, and displaying each multimedia content corresponding to the selected information flow tag in a second area of the information display page through the sub-view control; the multimedia content constituting second view information;
   wherein, in different sliding states for performing a sliding operation on the information display page, page sliding is controlled through different view controls, and the sliding states are used to indicate whether the first view information is slid out of the current page display range; the different view controls include the main view control and the sub-view control.

2. The method according to claim 1, wherein the sliding operation includes a first sliding operation; in a case that the sliding state indicates that the first view information has not been slid out of the current page display range, after displaying each multimedia content corresponding to the selected information flow tag in the second area of the information display page, further comprising:
   in response to the first sliding operation, controlling the first view information to slide in a first sliding direction according to a first sliding distance through the main view control;
   in response to a nested scrolling enable command, controlling the multimedia content displayed in the second area to slide in the first sliding direction according to the first sliding distance; wherein, there are changes to the information displayed in the first area and in the second area before and after sliding.

3. The method according to claim 1, wherein the sliding operation includes a second sliding operation for a first preset direction; in a case that the sliding state indicates that the first view information is slid out of the current page display range, after displaying each multimedia content corresponding to the selected information flow tag in the second area of the information display page, further comprising:
   in response to a second sliding operation, controlling the first view information to slide in the first preset direction according to currently dragged first distance in a second sliding distance through the main view control;
   in response to the first view information being slid out of the current page display range, sliding the multimedia content displayed in the second area through an offset sliding method corresponding to the sub-view control according to the remaining sliding distance in the second sliding distance; wherein, each multimedia content corresponding to the information flow tag is displayed in the first area after sliding, and the multimedia content displayed in the second area changes; the remaining sliding distance being equal to the difference between the second sliding distance and the first distance.

4. The method according to claim 3, wherein after sliding the multimedia content displayed in the second area according to the remaining sliding distance in the second sliding distance, further comprising:
   in response to a third sliding operation for a second preset direction, sliding the displayed multimedia content in the second preset direction according to currently dragged second distance in a third sliding distance through the sub-view control;
   in response to the first view information being slid to the current page display range, in response to the communication between a nested scrolling child interface of the sub-view control and a nested scrolling parent interface of the main view control, controlling the first view information to slide according to the difference between the third sliding distance and the second distance using a nested scroll command.

5. The method according to claim 4, wherein controlling the first view information to slide according to the difference between the third sliding distance and the second distance comprises:
acquiring a target field used to indicate a page scrolling state; the page scrolling state being a state that, after in response to a page scrolling operation, controlling the information display page to slide, it is necessary to continue to scroll the information display page according to the page sliding speed at the end of the page sliding;
in a case that the target field indicates that the page scrolling state is a closed state, controlling the first view information to slide according to the difference.

6. The method according to claim 1, wherein the sliding operation includes a page scrolling operation; in a case that the sliding state indicates that the first view information is slid out of the current page display range, after displaying each multimedia content corresponding to the selected information flow tag in the second area of the information display page, further comprising:
in response to the page scrolling operation for the first preset direction, determining a first inherited sliding speed of the information display page when the page scrolling operation ends;
determining the total distance to be slid according to the first inherited sliding speed;
controlling page sliding according to the first inherited sliding speed and the total distance to be slid through the main view control.

7. The method according to claim 6, wherein controlling page sliding according to the first inherited sliding speed and the total distance to be slid comprises:
determining a target sliding distance for controlling the sliding of the first view information according to the first inherited sliding speed;
in a case that the target sliding distance is less than the total distance to be slid, determining a second inherited sliding speed after sliding the target sliding distance;
in response to the first view information being slid out of the current page display range, sliding the displayed multimedia content according to the second inherited sliding speed.

8. A computer device, comprising: a processor and a memory having machine-readable instructions executable by the processor stored thereon, the processor being configured to execute the machine-readable instructions stored in the memory, when the machine-readable instructions are executed by the processor, executes a page information display method, the page information display method comprises:
in response to a trigger operation for a target vertical tag, displaying first view information in a first area of an information display page through a main view control;
laying out a view page turning control in the main view control through a nested layout control nested in the main view control, and nesting a sub-view control in the view page turning control;
displaying a plurality of information flow tags through the view page turning control, and displaying each multimedia content corresponding to the selected information flow tag in a second area of the information display page through the sub-view control; the multimedia content constituting second view information;
wherein, in different sliding states for performing a sliding operation on the information display page, page sliding is controlled through different view controls, and the sliding states are used to indicate whether the first view information is slid out of the current page display range; the different view controls include the main view control and the sub-view control.

9. The computer device of claim 8, wherein the sliding operation includes a first sliding operation; in a case that the sliding state indicates that the first view information has not been slid out of the current page display range, after displaying each multimedia content corresponding to the selected information flow tag in the second area of the information display page, further comprising:
in response to the first sliding operation, controlling the first view information to slide in a first sliding direction according to a first sliding distance through the main view control;
in response to a nested scrolling enable command, controlling the multimedia content displayed in the second area to slide in the first sliding direction according to the first sliding distance; wherein, there are changes to the information displayed in the first area and in the second area before and after sliding.

10. The computer device of claim 8, wherein the sliding operation includes a second sliding operation for a first preset direction; in a case that the sliding state indicates that the first view information is slid out of the current page display range, after displaying each multimedia content corresponding to the selected information flow tag in the second area of the information display page, further comprising:
in response to a second sliding operation, controlling the first view information to slide in the first preset direction according to currently dragged first distance in a second sliding distance through the main view control;
in response to the first view information being slid out of the current page display range, sliding the multimedia content displayed in the second area through an offset sliding method corresponding to the sub-view control according to the remaining sliding distance in the second sliding distance; wherein, each multimedia content corresponding to the information flow tag is displayed in the first area after sliding, and the multimedia content displayed in the second area changes; the remaining sliding distance being equal to the difference between the second sliding distance and the first distance.

11. The computer device of claim 10, wherein after sliding the multimedia content displayed in the second area according to the remaining sliding distance in the second sliding distance, further comprising:
in response to a third sliding operation for a second preset direction, sliding the displayed multimedia content in the second preset direction according to currently dragged second distance in a third sliding distance through the sub-view control;
in response to the first view information being slid to the current page display range, in response to the communication between a nested scrolling child interface of the sub-view control and a nested scrolling parent interface of the main view control, controlling the first view information to slide according to the difference between the third sliding distance and the second distance using a nested scroll command.

12. The computer device of claim 11, wherein controlling the first view information to slide according to the difference between the third sliding distance and the second distance comprises:
   acquiring a target field used to indicate a page scrolling state; the page scrolling state being a state that, after in response to a page scrolling operation, controlling the information display page to slide, it is necessary to continue to scroll the information display page according to the page sliding speed at the end of the page sliding;
   in a case that the target field indicates that the page scrolling state is a closed state, controlling the first view information to slide according to the difference.

13. The computer device of claim 8, wherein the sliding operation includes a page scrolling operation; in a case that the sliding state indicates that the first view information is slid out of the current page display range, after displaying each multimedia content corresponding to the selected information flow tag in the second area of the information display page, further comprising:
   in response to the page scrolling operation for the first preset direction, determining a first inherited sliding speed of the information display page when the page scrolling operation ends;
   determining the total distance to be slid according to the first inherited sliding speed;
   controlling page sliding according to the first inherited sliding speed and the total distance to be slid through the main view control.

14. A non-transitory computer-readable storage medium, characterized in that, the computer-readable storage medium having a computer program stored thereon, which, when run by a computer device, the computer device executes a page information display method, the page information display method comprises:
   in response to a trigger operation for a target vertical tag, displaying first view information in a first area of an information display page through a main view control;
   laying out a view page turning control in the main view control through a nested layout control nested in the main view control, and nesting a sub-view control in the view page turning control;
   displaying a plurality of information flow tags through the view page turning control, and displaying each multimedia content corresponding to the selected information flow tag in a second area of the information display page through the sub-view control; the multimedia content constituting second view information;
   wherein, in different sliding states for performing a sliding operation on the information display page, page sliding is controlled through different view controls, and the sliding states are used to indicate whether the first view information is slid out of the current page display range; the different view controls include the main view control and the sub-view control.

15. The non-transitory computer-readable storage medium of claim 14, wherein the sliding operation includes a first sliding operation; in a case that the sliding state indicates that the first view information has not been slid out of the current page display range, after displaying each multimedia content corresponding to the selected information flow tag in the second area of the information display page, the page information display method further comprises:

in response to the first sliding operation, controlling the first view information to slide in a first sliding direction according to a first sliding distance through the main view control;
   in response to a nested scrolling enable command, controlling the multimedia content displayed in the second area to slide in the first sliding direction according to the first sliding distance; wherein, there are changes to the information displayed in the first area and in the second area before and after sliding.

16. The non-transitory computer-readable storage medium of claim 14, wherein the sliding operation includes a second sliding operation for a first preset direction; in a case that the sliding state indicates that the first view information is slid out of the current page display range, after displaying each multimedia content corresponding to the selected information flow tag in the second area of the information display page, the page information display method further comprises:
   in response to a second sliding operation, controlling the first view information to slide in the first preset direction according to currently dragged first distance in a second sliding distance through the main view control;
   in response to the first view information being slid out of the current page display range, sliding the multimedia content displayed in the second area through an offset sliding method corresponding to the sub-view control according to the remaining sliding distance in the second sliding distance; wherein, each multimedia content corresponding to the information flow tag is displayed in the first area after sliding, and the multimedia content displayed in the second area changes; the remaining sliding distance being equal to the difference between the second sliding distance and the first distance.

17. The non-transitory computer-readable storage medium of claim 16, wherein after sliding the multimedia content displayed in the second area according to the remaining sliding distance in the second sliding distance, the page information display method further comprises:
   in response to a third sliding operation for a second preset direction, sliding the displayed multimedia content in the second preset direction according to currently dragged second distance in a third sliding distance through the sub-view control;
   in response to the first view information being slid to the current page display range, in response to the communication between a nested scrolling child interface of the sub-view control and a nested scrolling parent interface of the main view control, controlling the first view information to slide according to the difference between the third sliding distance and the second distance using a nested scroll command.

18. The non-transitory computer-readable storage medium of claim 17, wherein controlling the first view information to slide according to the difference between the third sliding distance and the second distance comprises:
   acquiring a target field used to indicate a page scrolling state; the page scrolling state being a state that, after in response to a page scrolling operation, controlling the information display page to slide, it is necessary to continue to scroll the information display page according to the page sliding speed at the end of the page sliding;
   in a case that the target field indicates that the page scrolling state is a closed state, controlling the first view information to slide according to the difference.

19. The non-transitory computer-readable storage medium of claim 14, wherein the sliding operation includes a page scrolling operation; in a case that the sliding state indicates that the first view information is slid out of the current page display range, after displaying each multimedia content corresponding to the selected information flow tag in the second area of the information display page, the page information display method further comprises:
- in response to the page scrolling operation for the first preset direction, determining a first inherited sliding speed of the information display page when the page scrolling operation ends;
- determining the total distance to be slid according to the first inherited sliding speed;
- controlling page sliding according to the first inherited sliding speed and the total distance to be slid through the main view control.

20. The non-transitory computer-readable storage medium of claim 19, wherein controlling page sliding according to the first inherited sliding speed and the total distance to be slid comprises:
- determining a target sliding distance for controlling the sliding of the first view information according to the first inherited sliding speed;
- in a case that the target sliding distance is less than the total distance to be slid, determining a second inherited sliding speed after sliding the target sliding distance;
- in response to the first view information being slid out of the current page display range, sliding the displayed multimedia content according to the second inherited sliding speed.

* * * * *